US008286140B2

(12) United States Patent
Sadowsky (10) Patent No.: US 8,286,140 B2
(45) Date of Patent: Oct. 9, 2012

(54) SYSTEM, COMPUTER PROGRAM, AND METHOD FOR A STATIC CODE COVERAGE ANALYZER FOR COMPUTER PROGRAMS

(75) Inventor: Alan S. Sadowsky, Scottsdale, AZ (US)

(73) Assignee: American Express Travel Related Services Company, Inc., New York, NY (US)

( * ) Notice: Subject to any disclaimer, the term of this patent is extended or adjusted under 35 U.S.C. 154(b) by 1019 days.

(21) Appl. No.: 12/249,290

(22) Filed: Oct. 10, 2008

(65) Prior Publication Data

US 2010/0095274 A1    Apr. 15, 2010

(51) Int. Cl.
    *G06F 9/44*        (2006.01)
(52) U.S. Cl. ........................................ 717/128; 717/124
(58) Field of Classification Search .................. 717/124, 717/128
    See application file for complete search history.

(56) References Cited

U.S. PATENT DOCUMENTS

| 7,665,072 | B2 * | 2/2010 | Tillman et al. ................. 717/132 |
| 2004/0025083 | A1 * | 2/2004 | Nanja et al. ...................... 714/35 |
| 2006/0010429 | A1 * | 1/2006 | Ihara .............................. 717/126 |
| 2009/0007077 | A1 * | 1/2009 | Musuvathi et al. ........... 717/130 |
| 2009/0187892 | A1 * | 7/2009 | Ohi et al. ....................... 717/126 |

\* cited by examiner

*Primary Examiner* — Philip Wang
(74) *Attorney, Agent, or Firm* — Snell & Wilmer L.L.P.

(57) ABSTRACT

Methods, systems and computer program products are provided for analyzing a computer program including an analysis module constructed to generate a work file including test instance elements associated with a program under test, count a total number of each test instance in the program under test, and create a test case corresponding to each instance.

15 Claims, 10 Drawing Sheets

TPF ASSEMBLER PROGRAM TEST ANALYZER

Program Name: AS7200

- Assembly Details         Assembler Date, Time, Version
- Program Interfaces       ENTER macro calls
- Error Calls              System Errors
- Using Assignments        Program Element Base Registers
- Branch Instructions      Changes in Logic Flow
- TPF Database Finds       Conventional Find Macros
- TPF Database Files       Conventional File Macros
- TPFDF Service Calls      DF specific Macro calls
- Test Case Analysis       Testing Recommendations
- Generate Test Cases      Planning and Execution

PF1/13 HELP   PF3/15 EXIT

Figure 6

```
GA7100        INFO           A1  V 72           1BLK  07/08/02
= = =>  _
ASSEMBLY DATE  (MM/DD/YY)   –   04/10/07
ASSEMBLY TIME (HH.MM)       –   14.15
PROGRAM VERSION NUMBER      –   25
PROGRAM ASSEMBLED SIZE      –   00000C2D  HEX

6115  +*, NOTE: ASSEMBLED WITH MACRO VERSION = 173
12982  +*, AUTO-STORAGE ALLOCATED, USER AREA = 376 BYTES
14485  +*,           UPDATE=05OCT04   VERS=33   SIZE=L4  ID=21
19137  +*,           UPDATE=05OCT04   VERS=33   SIZE=L4  ID=21
20380  +*, NOTE:  THE TMSMA MACRO GENERATES AN ENTRC
23559  +*, **** PROGRAM ASSEMBLED WITH TPFDF 1.1.3/CEP
24920  +*, RELEASE OF SWOOSR ASSUMED
25852  +*, NOTE:  THE TMSMA MACRO GENERATES AN ENTRC
25985  +*, NUMBER OF PRIOR LISTC STATEMENTS = 1
```

Figure 7

| JA2100 | INFO | A1 V 38 | | |
|---|---|---|---|---|
| = = => | | | | |
| Program calls found in program JA2100 | | | | |
| Listing | Stmnt | Macro | Calls | Pgm |
| 000032 | 5942 | ENTDC | ---> | JA22 |
| 000092 | 6038 | ENTDC | ---> | KB21 |
| 0000A6 | 6057 | ENTDC | ---> | NQ21 |
| 0000C6 | 6079 | ENTDC | ---> | NH21 |
| 0000DE | 6091 | ENTDC | ---> | NG21 |
| 0000F6 | 6103 | ENTDC | ---> | LA21 |
| 00010E | 6115 | ENTDC | ---> | LB21 |
| 000158 | 6143 | ENTDC | ---> | NA21 |
| 00017C | 6158 | ENTDC | ---> | JC21 |
| 00019A | 7492 | ENTDC | ---> | AB21 |
| 0001A6 | 7500 | ENTDC | ---> | NB21 |
| 0001CA | 7516 | ENTDC | ---> | LC21 |
| 0001DA | 7532 | ENTDC | ---> | LD21 |
| 0001E6 | 7544 | ENTDC | ---> | OA21 |

Total ENTER calls executed = 14

Figure 8

| JA2100 | INFO | A1 V 38 |
|---|---|---|
| = = => | | |
| Error calls found in program JA2100 | | |
| Listing | Stmnt | Macro |
| 000214 | 7573 | SERRC E, 200030, MSG |

Total ENTER calls executed = 1

Figure 9

```
EA9100         INFO   A1  V  35
= = =>  _
Active Using assignments in EA9100
  $IS$          --->   uses R8
  CR40AE        --->   uses R4
  CR40AE$       --->   uses R5
  CR41AE        --->   uses R14
  CR43AE        --->   uses R14
  EB0EB         --->   uses R9
  LWRS1         --->   uses R2
  LWRWR$        --->   uses R1
  SW00SR        --->   uses R3
  WK_BLCK       --->   uses R7
```

Figure 10

```
EA9100        INFO         A1  V  59           1BLK 07/07/13
= = =>  _
Branch calls found in program EA9100
  Listing      Stmnt                 Branch 00001A       7289         ICM      R2, 15, LWRSEA3$+4    +++++
  00001E       7290         CLI      LWRSES2$, C'R'
  000022       7291         BE       EA91_1000
  000026       7292         CLI      LWRSES2$, C'U'
  00002A       7293         BE       EA91_2000
  0000AE       9050         CLI      SW00RTN, #TPFDBOK
  0000B2       9051         BNE      EA91_8001
  0000BA       9059         OC       CR40FA3, CR40FA3
  0000C0       9060         BNZ      EA91_1900
```

Figure 11

```
JA2100                INFO                A1 V 43
===→ _
TPF database reads found in program JA2100
Listing              Stmnt               Macro
000208               7564                FINWC D3, JA21085
Total TPF FIND calls executed = 1
```

Figure 12

```
JA2200                INFO                A1 V 44
=== →_
TPF database writes found in program JA2200
Listing              Stmnt               Macro
00046E               15631               FILNC D3
Total TPF FILE calls executed = 1
```

Figure 13

| EA9100 | INFO | A1 V39 |
|---|---|---|
| === →_ | | |
| TPFDF calls in program EA9100 | | |
| Stmnt | Macro | Record |
| 7303 | DBOPN | REF=CR40AE, |
| 8677 | DBRED | REF=CR40AE, |
| 9079 | DBOPN | REF=CR40AE, |
| 9349 | DBRED | REF=CR40AE, |
| 9732 | DBMOD | REF=CR40AE, |
| 10070 | DBADD | REF=CR40AE, |
| 10460 | DBOPN | REF=CR40AE, |
| 10730 | DBRED | REF=CR40AE, |
| 11112 | DBDEL | REF=CR40AE, |
| 11484 | DBCLS | REF=CR40AE, |
| 11821 | DBCLS | REF=CR40AE, |
| 13267 | DBOPN | REF=CR43AE, |
| 13527 | DBCRE | REF=CR43AE, |
| 13860 | DBCLS | REF=CR43AE, |
| Total TPFDF calls executed = 14 | | |

FIG. 14

SYSTEM, COMPUTER PROGRAM, AND METHOD FOR A STATIC CODE COVERAGE ANALYZER FOR COMPUTER PROGRAMS

BACKGROUND

An example aspect of the present invention generally relates to software testing, and more particularly to a system, computer program, and method for a static code coverage analyzer for computer programs.

RELATED ART

Static code analysis is the analysis of computer software, typically for detecting programming errors, that is performed without actually executing the software. The analysis can be performed on multiple forms of the non-executable version of computer software, such as the source code or the object code.

There are many considerations inherent in running such a static code analysis. For instance, the analysis must take into account the program calls and procedure returns made within the program being analyzed, as each external program can affect overall reliability. The complexity surrounding branch instructions, error handling, and register usage, to name a few, all conspire to render analysis of a program difficult such that a programmer often still does not fully see what a complex program is doing. This difficulty is compounded if a program has been incorrectly coded. Still, despite its complexity, static code analysis helps uncover code errors before the code is implemented in the real world, and thus any aid in static code analysis could save the programming industry money and improve the end user experience. Typical testing procedures and practices (e.g., risk-based testing analysis) center primarily on developing "behavioral" test cases to validate the functionality of the software as defined in the underlying business requirements. As such, the structural testing of the code itself presents numerous technical challenges and is often deficient.

BRIEF DESCRIPTION

The present tool provides a system, computer program, and method for a static code coverage analyzer for computer programs. A list of the executable instructions of the computer program is input into the tool. A user of the tool can then select from a number of options to have the tool return statistics about the program or generate a comprehensive report of some or all of the available statistics.

The user can launch the analysis tool and loads the computer program to be analyzed. The tool extracts information from the computer program, such as the program code, production details, external program interactions, coded error routines, register assignments, conditional branches, and database interactions from the computer program. Subsequently, the analysis tool calculates a recommended minimum number of test cases from the extractions. Finally, the results of the above described extractions and calculations are returned to the user, as well as any suggestions offering testing tips to take into account when testing the submitted software. Such a method could be used to complement a comprehensive pre-launch test of a program such that the end-user experience is relatively trouble-free.

In one embodiment of the present invention, a method, computer-readable medium, and system are provided for analyzing a computer program which provide generating a work file, the work file including at least one test instance element and being associated with the computer program, counting a total number of each test instance in the computer program, and creating a test case corresponding to each instance.

Features and advantages as well as the structure and operation of various embodiments of the present tool are described in detail below with reference to the accompanying drawings.

BRIEF DESCRIPTION OF THE DRAWINGS

The features and advantages of the example embodiment presented herein will become more apparent from the detailed description set forth below when taken in conjunction with the drawings in which like reference numbers indicate identical or functionally similar elements.

DETAILED DESCRIPTION

The present tool is directed to a system, method, and computer product for a static code analyzer for computer programs and is now described in more detail herein in terms of an exemplary analysis system for analyzing an Assembler program listing. This is for convenience only and is not intended to limit the application of the present tool. In fact, after reading the following description, it will be apparent to one skilled in the relevant art how to implement the following tool in alternative embodiments (e.g., analysis of a code files from multiple programming languages: C, C++, Java, Visual Basic, etc.).

The terms "user," "tester," "programmer," and/or the plural form of these terms are used interchangeably throughout herein to refer to those persons or entities capable of accessing, using, being affected by and/or benefiting from the tool for analysis of a computer program.

Further, the terms "program under test," "computer program," "program," "code," "listing," "source code," and/or the plural form of these terms are used interchangeably throughout herein to refer to the computer code capable of being analyzed by the tool for analysis of a computer program.

Figure 1:
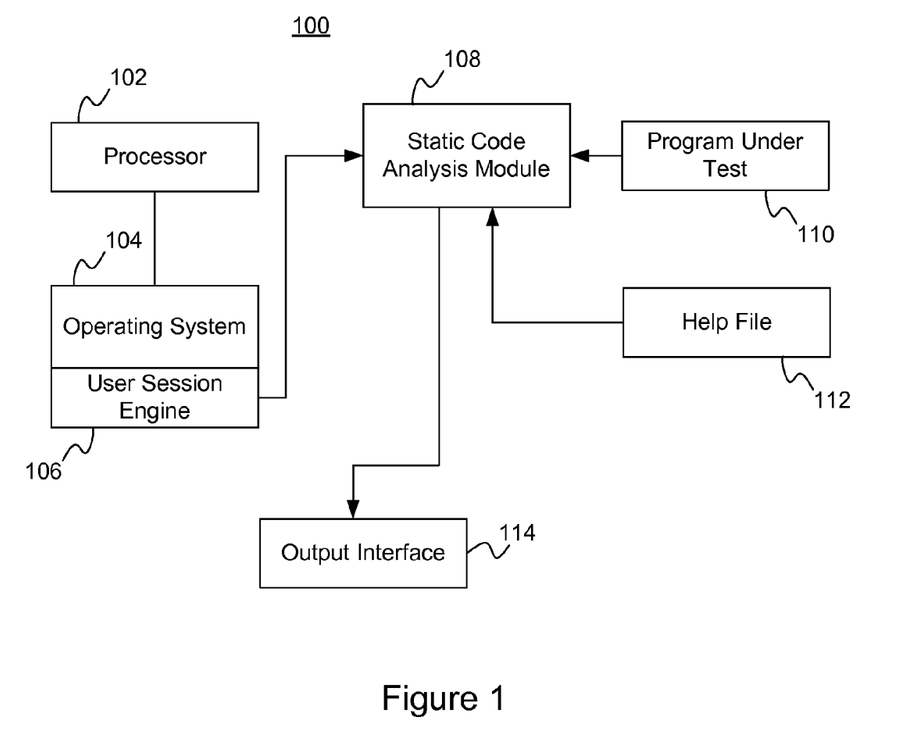
FIG. 1 depicts a system for analyzing static code for computer programs in accordance with an embodiment of the present invention.

FIG. 1 depicts a system 100 (also referred to as a "program analyzer" or "tester") for analyzing static code for computer programs in accordance with an embodiment of the present invention. System 100 includes a processor 102 for running computer software and hardware. Processor 102, for example, runs operating system 104 and executes computer programs. A user session engine 106 provides an instance of an interaction between the user and the operating system 104. The user can utilize the user session engine 106 to direct the system 100 to perform various tasks, such as assembling a program and editing a computer program under test 110.

The user also utilizes user session engine 106 to run a static code analysis module (also referred to simply as "analysis module") 108. Particularly, analysis module 108 is a program initiated by user session engine 106 to perform various program, assembler routine, and call extractions. In one embodiment, input parameters for analysis module 108 can include a computer program under test 110 and a help file 112. These extractions are described in more detail below with respect to FIGS. 2-4.

Output interface 114 communicates information, such as the results of an analysis, with the user. Example devices through which output engine 114 presents this information include, but are not limited to, data displays, report generation, computer monitors, network interfaces, printers, and the like.

Figure 2:
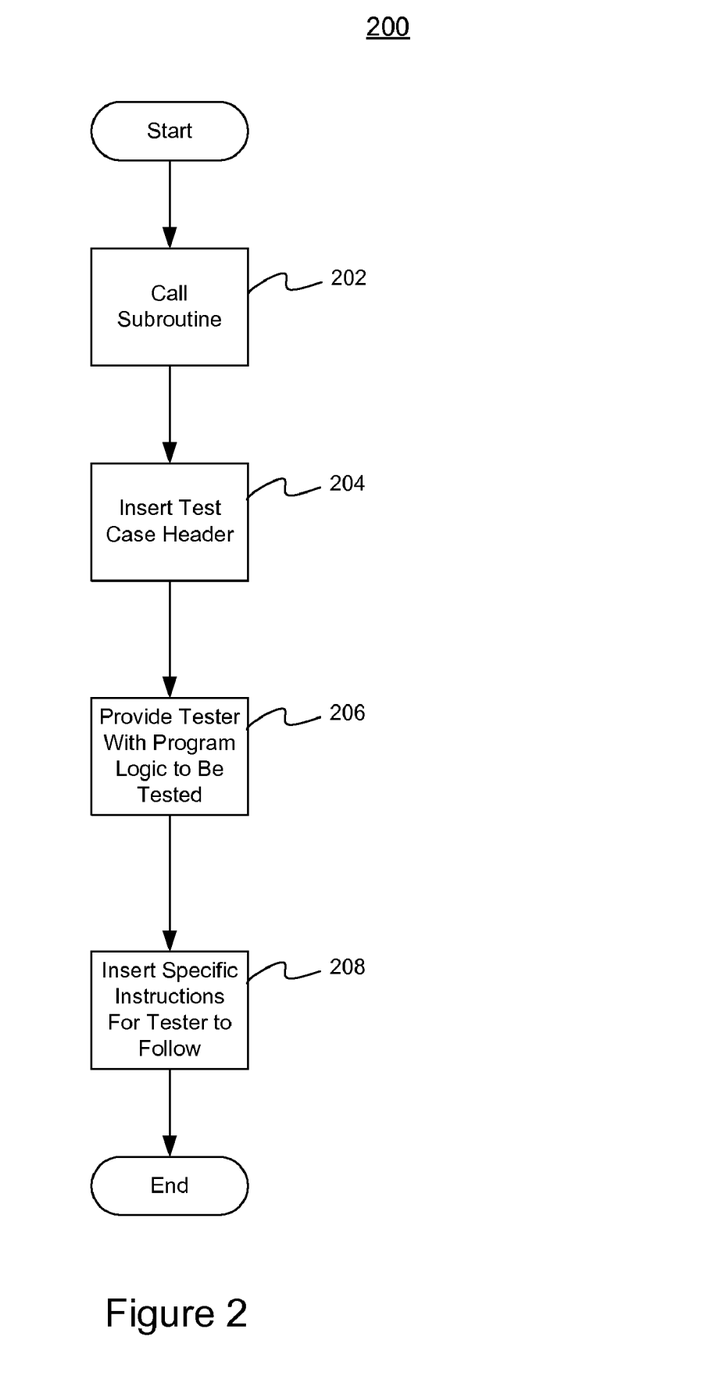
FIG. 2 depicts an example procedure for static code analysis for computer programs in accordance with an embodiment of the present invention.

FIG. 2 depicts an example procedure 200 for static code analysis for computer programs in accordance with an embodiment of the present invention. At block 202 a subroutine is called and processed as follows. Static code analysis module 108, at block 204 inserts a test case header that assigns to a record a unique test case number and a high-level test case classification that identifies the area of the program under test 110 to be tested. At block 206, analysis module 108 provides the tester with the specific program logic to be tested and, at block 208, inserts specific instructions for the tester to follow, based on the test case classification of the instance. In the case of database facility (e.g., IBM's Transaction Processing Facility Database Facility or TPFDF) service calls, these instructions are specific and unique to the actual type of service call being issued.

For example, in the case of testing a program interface, error processing and conditional branching, the following program logic and specific instructions may be provided inserted into a test case header and provided to the tester:
*TEST CASE 1—Program Interface*
GA7100 issues a ENTRC UA71 at displacement 00004E.
  Validate that GA7100 is passing UA71 what it expects.
*TEST CASE 22—Error Processing*
GA7100 issues a SNAPC E,C00110,MSG=MESSAG2, LIST=SNPSTUF2 at statement 25889.
  Validate that all paths to the SNAPC are tested.
  Verify that all switches are set correctly if exiting.
*TEST CASE 39—Conditional Branch*
GA7100 issues a LTR R0,R0 at displacement 000162.
  Test both processing paths whether the BRANCH is taken or not.

Figure 3:
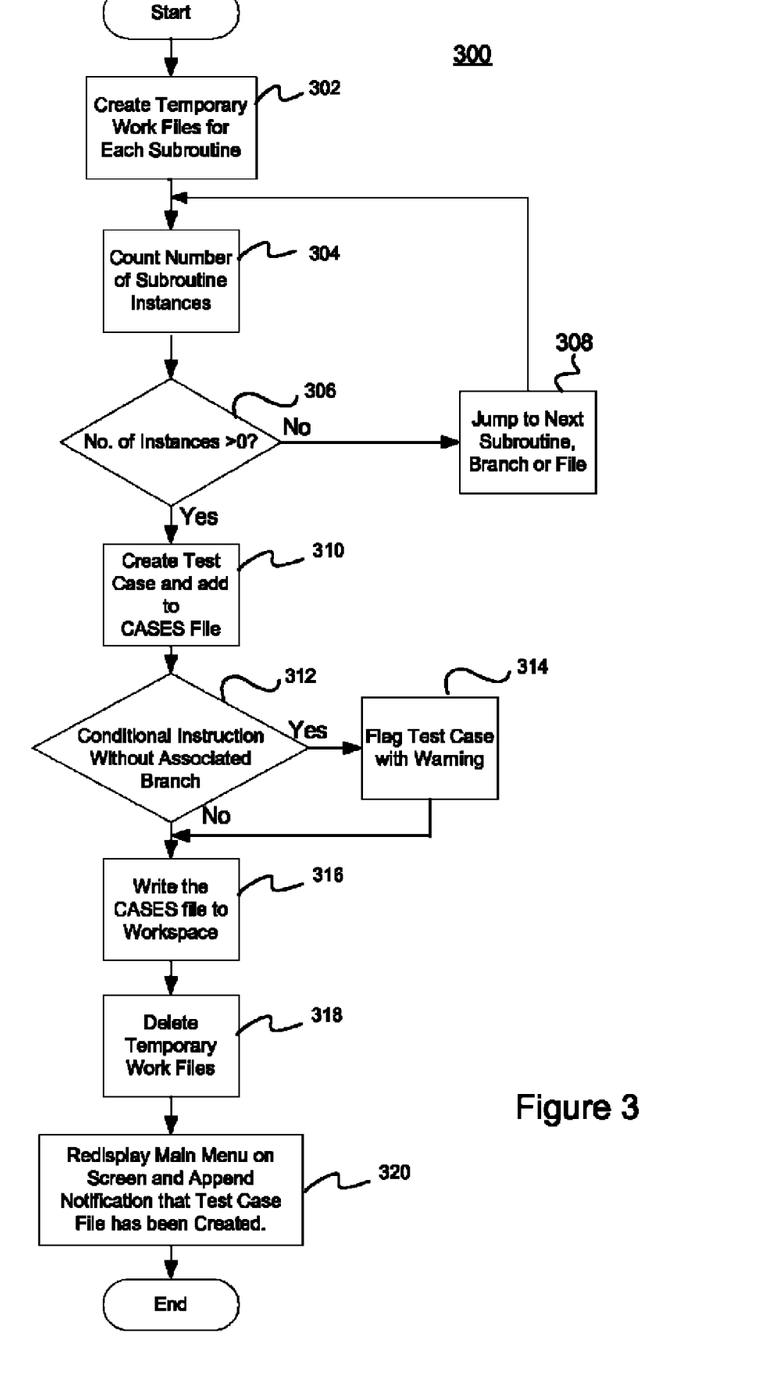
FIG. 3 depicts an example procedure illustrating a subroutine breakout in accordance with an embodiment of the present invention.
Figure 5:
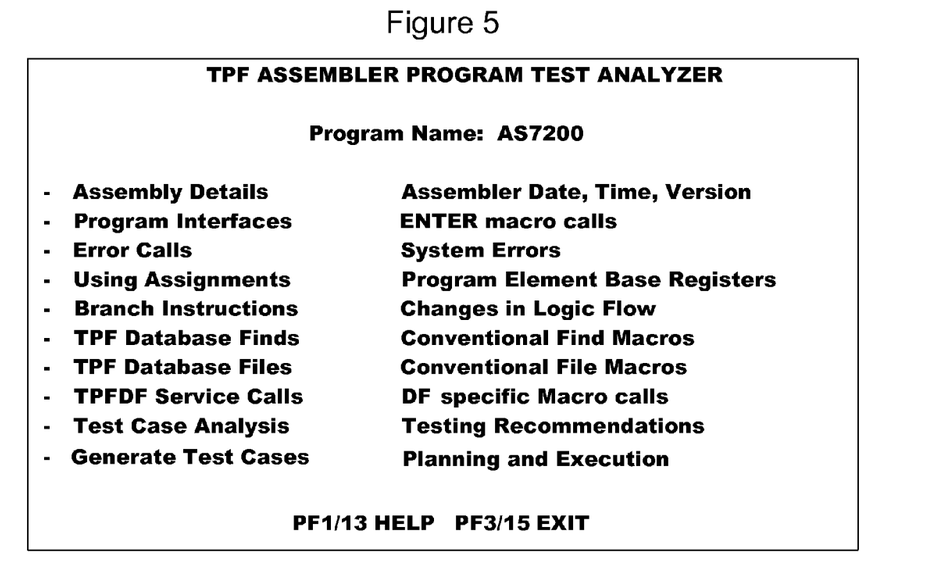
FIG. 5 is an example screenshot of a menu screen in accordance with an embodiment of the present invention.

FIG. 3 depicts an example procedure 300 illustrating a subroutine breakout in accordance with an embodiment of the present invention. Procedure 300 is executed to generate test cases and may be initiated, for example, by a user selecting a "Generate Test Cases" option from a main menu (FIG. 5) presented to a user through user session engine 106.

At block 302, analysis module 108 creates temporary work files for each subroutine, branch and file of the program under test 110. The following are exemplary subroutines, branches and files: program calls (e.g., "ENTER," "BACK," "CREATE"), system errors ("SERRC"), system snapshots ("SNAPC"), conditional branches ("BRANCHES"), standard TPF data record subroutines (e.g., "FINDS"), standard TPF data record files ("FILES"), and TPFDF database service calls, to name a few.

At block 304, analysis module 108 retrieves the existing STATS file for a current TPF program test analyzer ("TPTA") session, and extracts and counts all of the subroutine, branch and file instances. A determination is made at block 306 whether the number of instances is greater than zero. If so, then at block 310 a test case is created for each instance and added to a CASES file. Otherwise, as shown at block 308, procedure 300 jumps to the next subroutine, branch and file, and processes the next routine accordingly.

For example, at block 304, analysis module 108 retrieves the existing STATS file for a current TPTA session, and extracts and counts all of the program call (e.g., "ENTER," "BACK," "CREATE") instances. A determination is made at block 306 whether the number of program call instances is greater than zero. If so, then at block 310 a test case is created for each instance and added to the CASES file. Otherwise, as shown at block 308 procedure 300 jumps to the next subroutine branch, or file and processes the next routine accordingly.

Blocks 304 through 310 also are used to process the subroutines branches and files described above, such as SERRC, SNAPC, TPF FINDS, standard TPF FILES, standard TPFDF database service calls, conditional instructions and associated branch instances. In the case of branches, at block 312, a determination is made whether the analysis has identified a conditional instruction without an associated branch. If so, the test case will be flagged with a warning and provide advice such as "*WARNING* Confirm that a BRANCH is not needed here" as shown at block 314.

Any necessary housekeeping is performed as shown at blocks 316, 318 and 320, for example, to write the CASES file to the user's workspace (block 316); delete all temporary work files from the user's workspace (block 318); and to redisplay a menu, such as the TPTA Main Menu, on a terminal screen and append notification that the test case file has been created (block 320).

Figure 4:
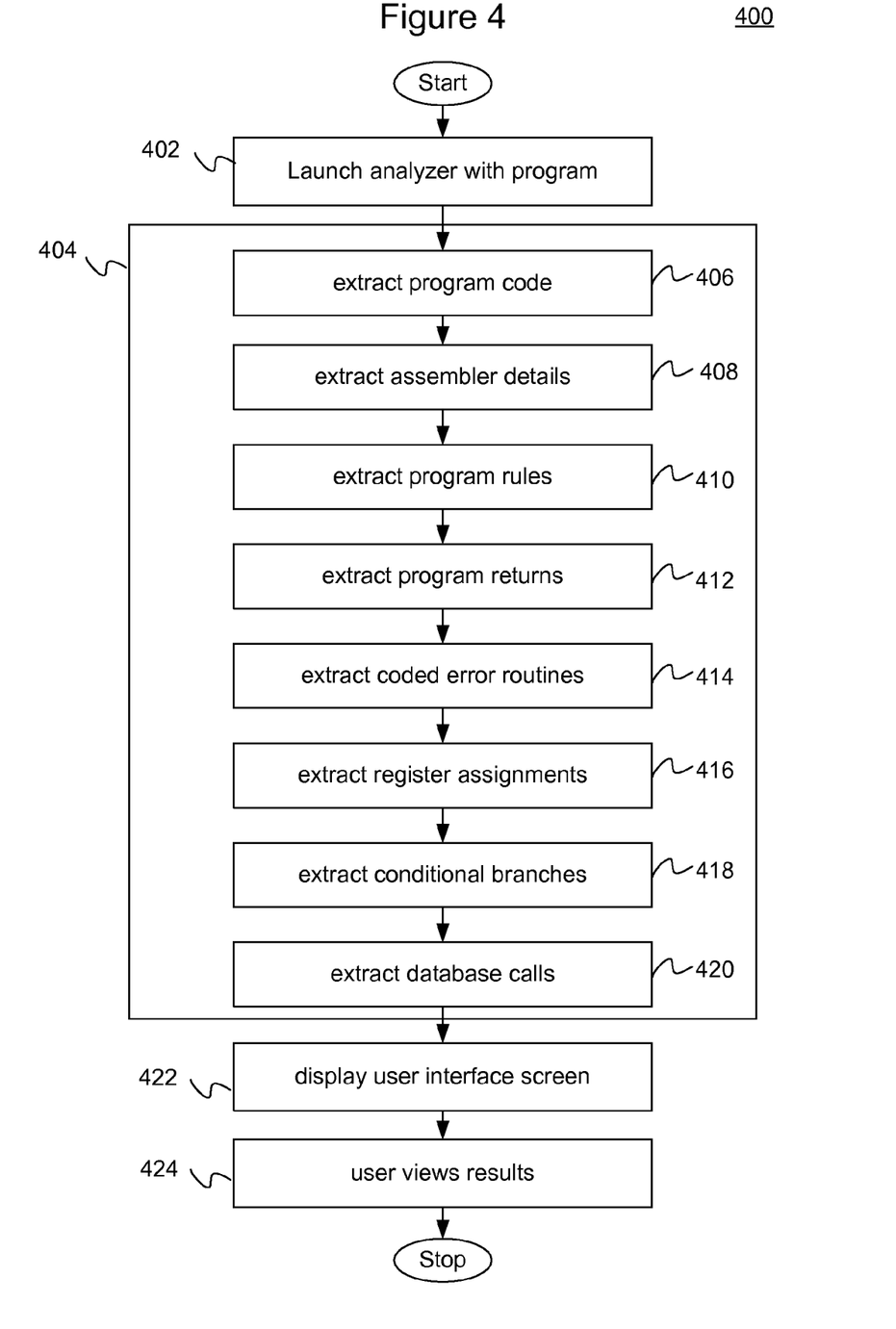
FIG. 4 depicts an example procedure for static code analysis for computer programs in accordance with an embodiment of the present invention.

FIG. 4 depicts an example procedure for static code analysis for computer programs in accordance with an embodiment of the present invention. In block 402, system 100 launches the static code analysis module 108 with the program under test 110. In an example embodiment, this launch takes place through a user session provided by user session engine 106. A command is entered on a command-line which invokes the analysis executable (i.e., static code analysis module 108) with the name of the computer program under test 110 as a variable. An example of such a command line call is "TPTA EA9100", where "TPTA" is the name of the analysis module 108, and "EA9100" is a program under test 110 to be analyzed. Alternatively, another string is used as an input variable to vary the behavior of system 100. For instance, entering "TPTA ?" returns the help file 112 to the user through the output interface 114. Accordingly, if a variable is input that is not recognized, an appropriate error message is returned to the user through the output interface 114.

In block 404, the system 100 examines the program under test 110 in detail and collects various statistics about the program. Particularly, static code analysis module 108 interrogates the program under test 110 and identifies the structural elements of the code that should be tested to insure complete test coverage prior to production implementation. Interrogation can be based at least in part on simple string and pattern matching of the text of the listing of the program under test 110 against a set of predefined keywords and patterns in a manner well known by one skilled in the relevant art. However, one skilled in the art will recognize that other forms of the computer program 110, such as the object code of the program, can be used for the analysis instead of or with the computer code listing.

In block 406, the system 100 extracts program code from the computer program 110. The extracted program code will be utilized as input for the other components of block 404.

Figure 6:
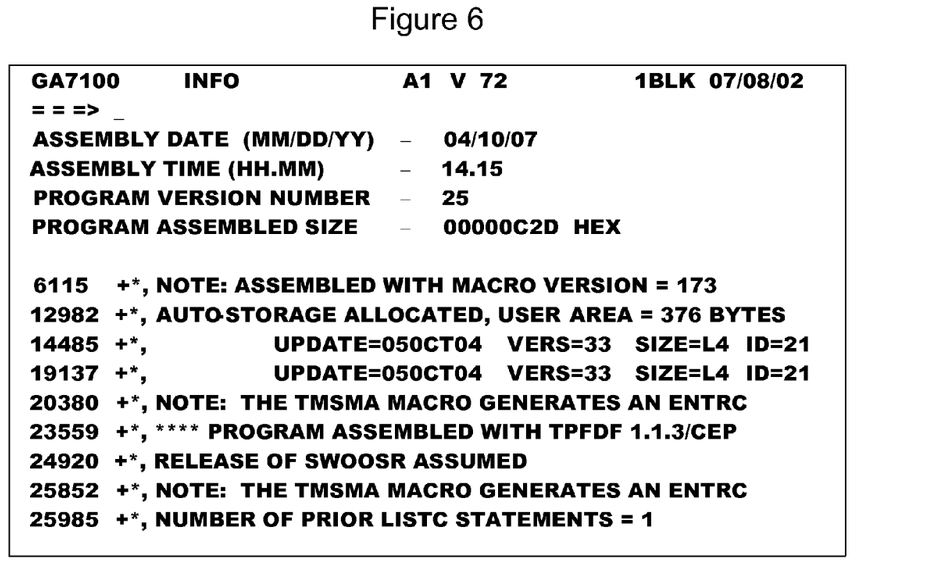
FIGS. 6-13 are example screenshots showing the results of static code analysis for computer programs in accordance with an embodiment of the present invention.

In block 408, production details (e.g., assembly date, assembly time, program version number, program assembled size, comments made by the assembler, and the like) are extracted from the program code. The results of the extraction are viewed in block 424, described below. An example screenshot showing production details retrieved as a result of the extraction is shown in FIG. 6.

Figure 7:
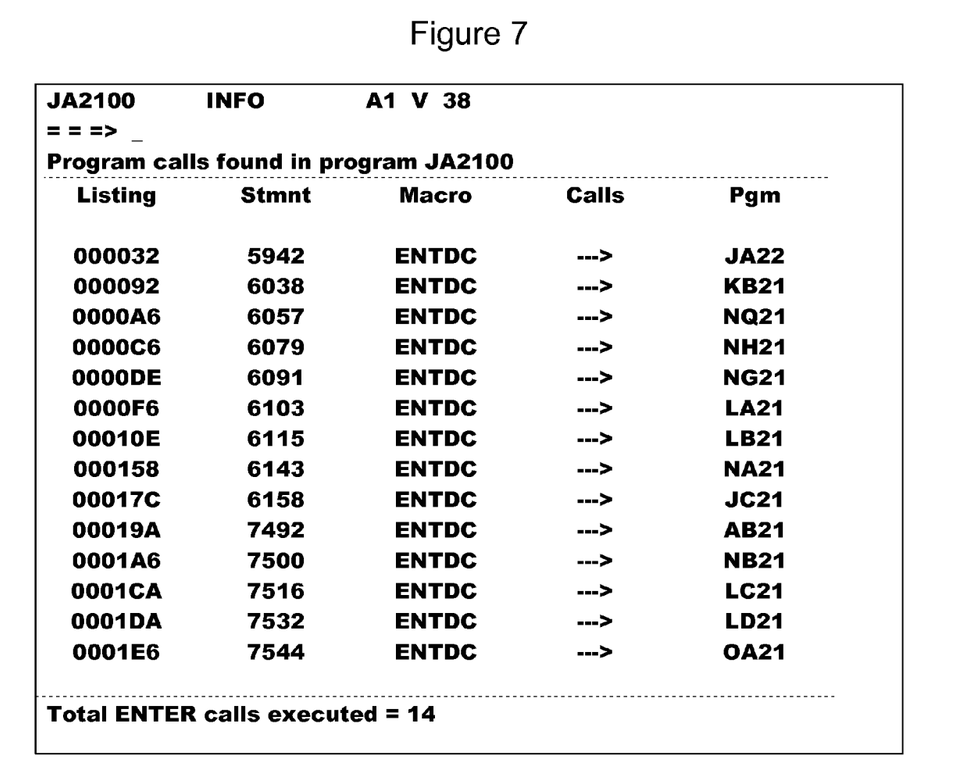

In block 410, the system 100 extracts any calls to external programs (e.g., "ENTRC" or "CREMC" in the TPF language) that the program code contains. In block 412, any returns to external programs (e.g. "BACKC" in TPF) that the computer program being analyzed contains are extracted. The results of these extractions are viewed in block 424, described below. An example screenshot showing the calls to external programs retrieved as a result of these extractions is shown in FIG. 7.

Figure 8:
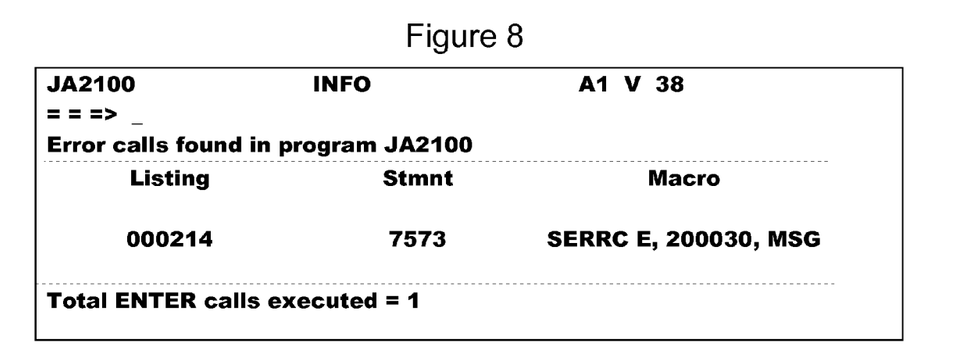

In block 414, any coded error routines (e.g., "SERRC" or "SNAPC" in TPF) that the program code contains are extracted. The results of the extraction are viewed in block 424, described below. An example screenshot showing coded error routines retrieved as a result of the extraction is shown in FIG. 8.

Figure 9:
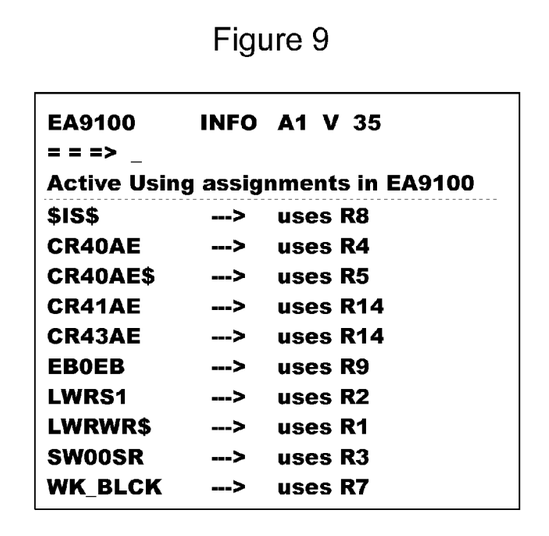

In block 416, any base register assignments (e.g., "USING" in TPF) that the program code contains are extracted. The results of the extraction are viewed in block 424, described below. An example screenshot showing base register assignments retrieved as a result of the extraction is shown in FIG. 9.

Figure 10:
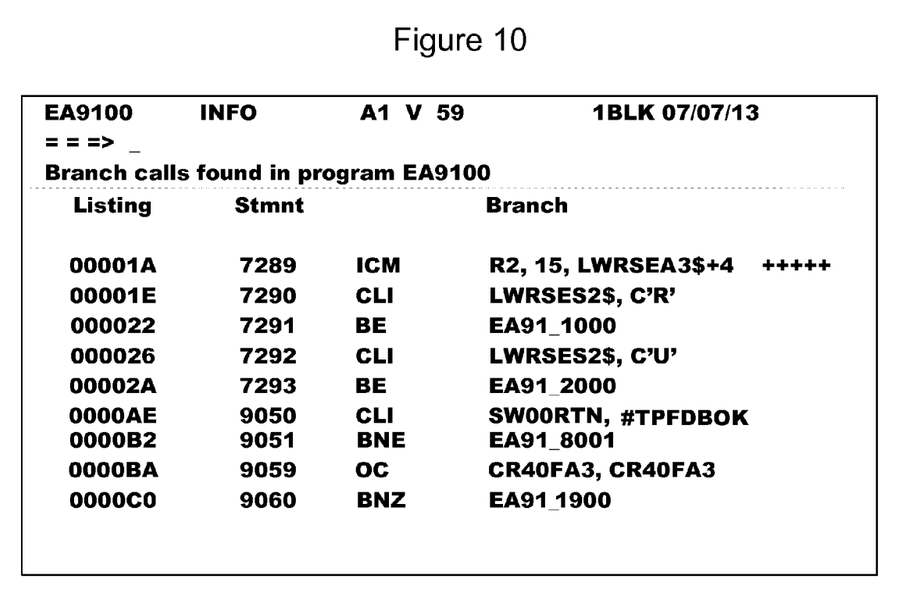

In block 418, any conditional branches (e.g. "BE", "BNE", "CLI", "TM", "BO", "LEVTA", "CLC", "LTR", "BM", "BZ", "BCT", etc. in TPF) that the program code contains are extracted. The results of the extraction are viewed in block 424, described below. An example screenshot showing conditional branches retrieved as a result of the extraction is shown in FIG. 10.

Figure 11:
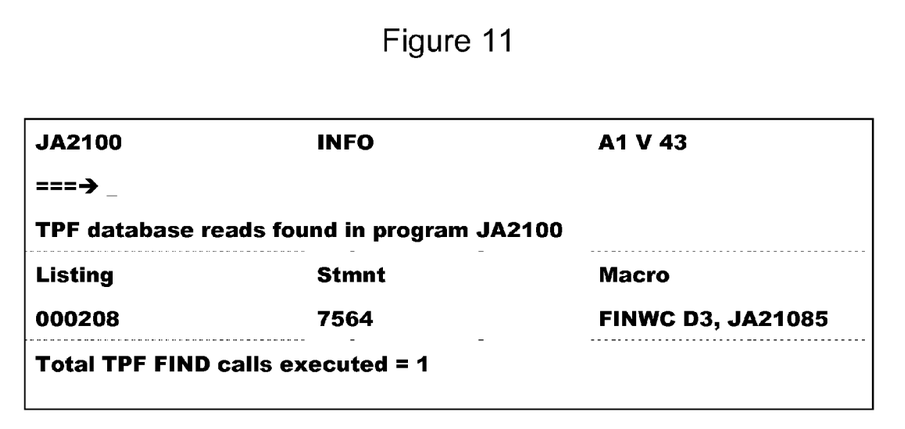

In block 420, all database interactions (e.g., database reads such as the "FIND" macros in TPF, writes such as the "FILE" macros in TPF, macros that alter the database such as the "TPFDF" macros in TPF, and similar) that the computer program being analyzed contains are extracted. However, more database interactions may be reported, depending on the particular implementation of the system 100. The results of the extraction are viewed in block 424, described below. Example screenshots showing database interactions retrieved as a result of the extraction are shown in FIGS. 11 (reads), 12 (writes), and 13 (specific separate programs with database interaction).

After performing the subroutines contained in block 404, system 100 displays a user interface in block 422 with which the user can utilize the above-described extracted data. An example user interface screen can be seen in FIG. 5. In the example in FIG. 5, users manipulate a cursor up or down with the arrow keys on a computer keyboard to highlight a selection and press "Return" or "Enter" to choose the highlighted selection.

Once the user selects an option, the system 100 then returns to the user the report associated with that choice in block 424. A detailed discourse on what information is returned according to each possible selection is discussed below but for illustration purposes only, and in no way limits the scope of block 424.

Choosing "Assembly Details" returns to the user an Assembly Details report (which can be implemented by returning the example screenshot shown in FIG. 6) using the results extracted at block 408.

Choosing "Program Interfaces" returns to the user a Program Interfaces report (which can be implemented by returning the example screenshot shown in FIG. 7) using the results extracted at blocks 410 and 412. The report shows the program call statement location (e.g. the statement number and displacement in the assembler listing) and the program that processing is being transferred to. If special recognized macros that call programs (e.g. TPF "CREATE" or "ENTER" macros) are in the program, these are also included in the report. Additionally, any commands that exit the program being analyzed are also listed.

Choosing "Error Calls" returns to the user an Error Calls report (which can be implemented by returning the example screenshot shown in FIG. 8) using the results extracted at block 414. The report shows the location of the error handling macro call (e.g. the assembler listing displacement and the statement number) and the error macro being executed.

Choosing "Using Assignments" returns to the user a Using Assignments report (which can be implemented by returning the example screenshot shown in FIG. 9) using the results extracted at block 416. The report shows the name of the symbol, as well as what register the symbol is linked to.

Choosing "Branch Instructions" returns to the user a Branch Instructions report (which can be implemented by returning the example screenshot shown in FIG. 10) using the results extracted at block 418. The report shows the location of each instruction (e.g. the assembler listing displacement and statement number) and the program tag being branched to. Moreover, conditional branches may receive a special flag to attract special attention from the tester.

Choosing "TPF Database Finds" returns to the user a TPF Database Finds report (which can be implemented by returning the example screenshot shown in FIG. 11) using a subset of the results extracted at block 420. The report shows the location of the database read macro call (e.g. the assembler listing displacement and the statement number) and the database read macro being executed.

Figure 12:
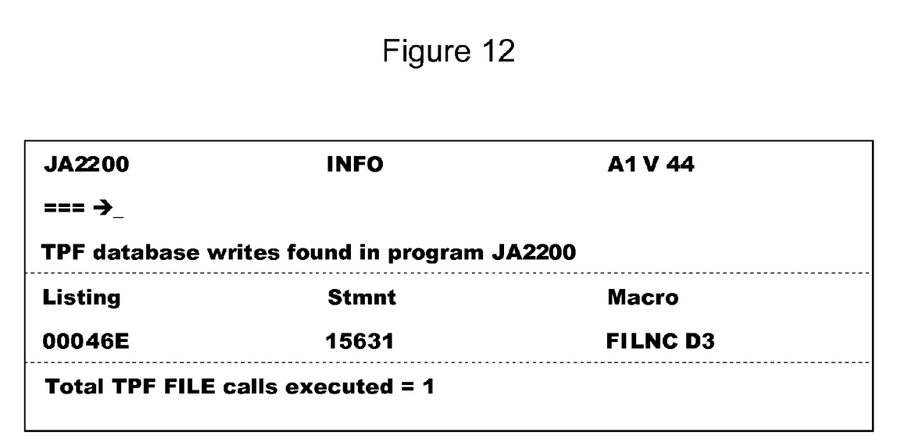

Choosing "TPF Database Files" returns to the user a TPF Database Files report (which can be implemented by returning the example screenshot shown in FIG. 12) using a subset of the results extracted at block 420. The report shows the location of the database write macro call (e.g. the assembler listing displacement and the statement number) and the database write macro being executed.

Figure 13:
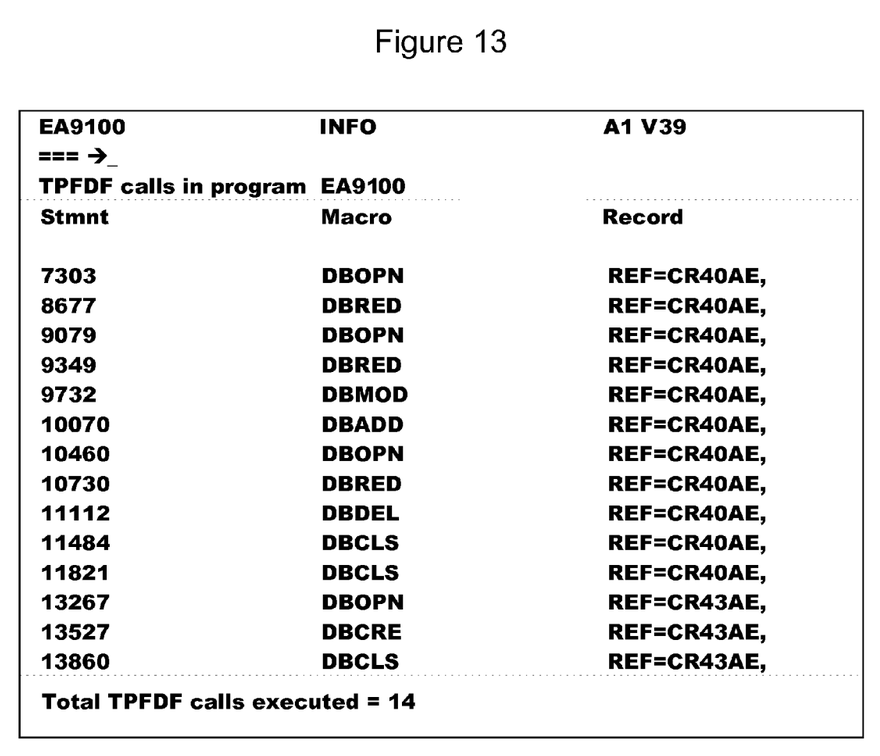

Choosing "TPFDF Service Calls" returns to the user a TPFDF Service Calls report (which can be implemented by returning the example screenshot shown in FIG. 13) using a subset of the results extracted at block 420. In this embodiment, this report details calls to TPFDF macros (which alter the database in the TPF assembly language). Alternative embodiments may contain references to alternative database altering macros, subroutines, programs, or the like. The report shows the location of the macro call (e.g. the statement number), the specific macro listed, and the database record being managed.

Choosing "Test Case Analysis" returns to the user a comprehensive report of the results extracted at block 404. Additionally, the report can include information in an embodiment-specific fashion that a tester should take into consideration when planning a test approach, such as a list of questions like, "What is the entire program doing?", "What other programs call your program, and are they passing you the correct information?", "What other programs are called by your program, and are you passing those programs the correct information?", "If your program does a BACKC, are you returning to that program with the correct information?", "What error conditions can occur, and how do you test for them?", "What are all of the possible paths leading to a SERRC or SNAPC?", "What database records are either read from or written to?", "What happens if the data read from a record is not what is normally expected, and how can you test for these situations?", "When writing to the database, are you testing for chains and overflow situations?", "Are you testing for all possible branch conditions in order to test for all possible branch paths throughout your code?", "Are you testing for correct register content with BR instructions?", and similar. However, those questions may be altered depending on the specific embodiment or testing situation.

Also, the "Test Case Analysis" report includes a recommended minimum number of test cases for the submitted program. The calculation is based on the statistics described above, and varies from implementation to implementation. For example, in the case of a conditional branch instruction, two possible actions can take place. Depending on the result of the preceding instruction, the program will either take the associated branch or will not. With two possible program paths to follow, two test cases would be counted and included in the minimum number of test cases estimated.

The present tool (i.e., system 100, procedures 200-400, or any part(s) or function(s) thereof) may be implemented using hardware, software or a combination thereof and may be implemented in one or more computer systems or other processing systems. However, the manipulations performed by the present tool were often referred to in terms, such as reviewing, screening, or flagging, which are commonly associated with mental operations performed by a human operator. No such capability of a human operator is necessary, or desirable in most cases, in any of the operations described herein which form part of the present tool. Rather, the operations are machine operations. Useful machines for performing the operation of the present tool include general purpose digital computers or similar devices.

Figure 14:
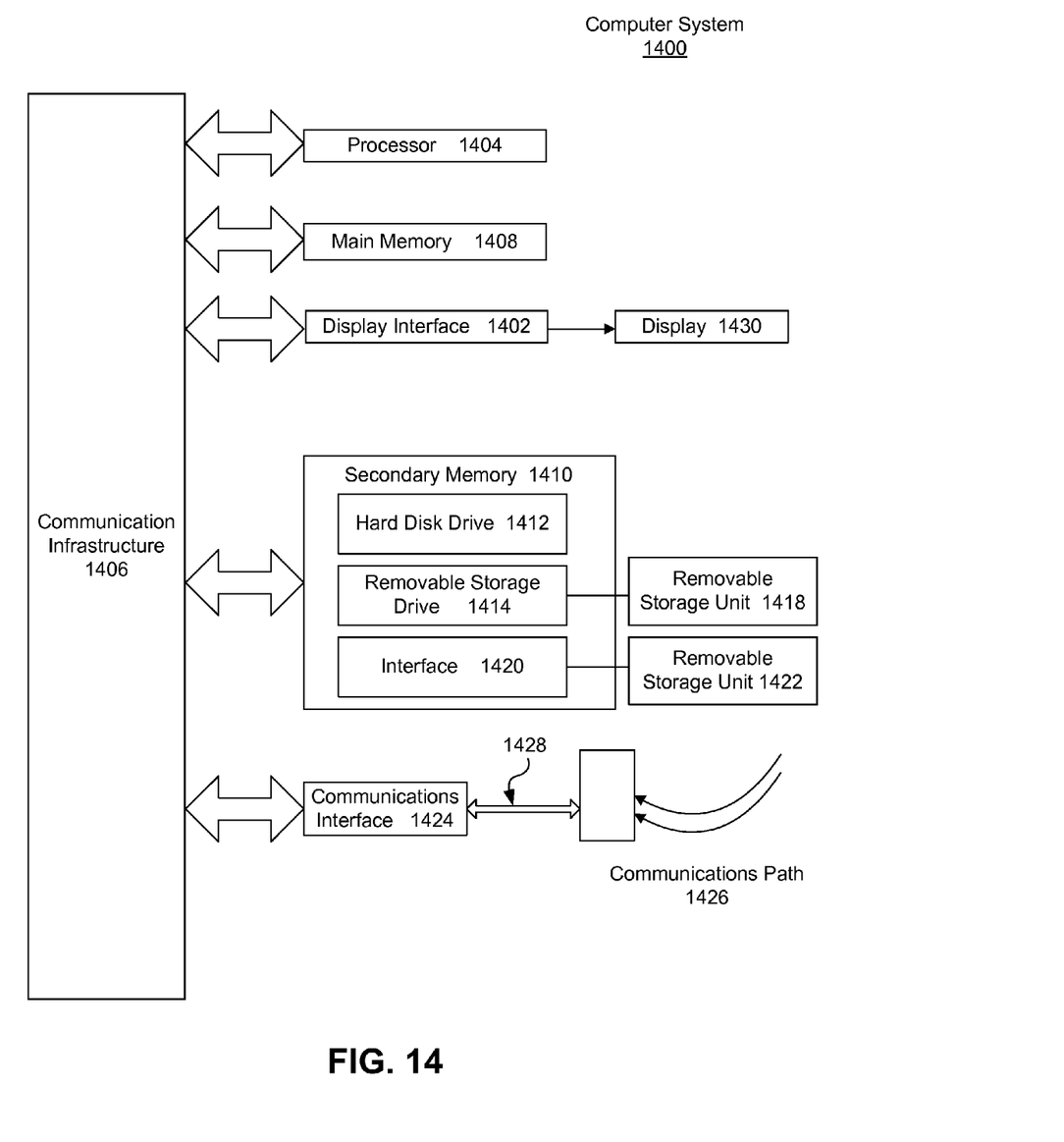
FIG. 14 is an example computer system useful for implementing the present tool in accordance with an embodiment of the present invention.

In fact, one example embodiment of the present invention is directed toward one or more computer systems capable of carrying out the functionality described herein. An example of a computer system 1400 is shown in FIG. 14.

The computer system 1400 includes one or more processors, such as processor 1404. The processor 1404 is connected to a communication infrastructure 1406 (e.g., a communications bus, cross-over bar, or network). Various software embodiments are described in terms of this example computer system. After reading this description, it will become apparent to a person skilled in the relevant art(s) how to implement the tool using other computer systems and/or architectures.

In a behavioral sense, test coverage provided by the techniques described above extends testing of a program under test to behavior (i.e., operations, activities, functions and other uses). Coverage can be measured qualitatively against uses which users and customers will subject the system, or quantitatively against predetermined requirements, quality risks, design specifications and the like.

In a structural sense, test coverage provided by the above-described techniques extends to cover the code or components in the system under test. The metric usually expressed as a percentage of the total count of whatever structural element is being covered, such as lines of code or function points.

Computer system 1400 can include a display interface 1402 that forwards graphics, text, and other data from the communication infrastructure 1406 (or from a frame buffer not shown) for display on the display unit 1430.

Computer system 1400 also includes a main memory 1408, preferably random access memory (RAM), and may also include a secondary memory 1410. The secondary memory 1410 may include, for example, a hard disk drive 1412 and/or a removable storage drive 1414, representing a floppy disk drive, a magnetic tape drive, an optical disk drive, etc. The removable storage drive 1414 reads from and/or writes to a removable storage unit 1418 in a well known manner. Removable storage unit 1418 represents a floppy disk, magnetic tape, optical disk, etc. which is read by and written to by removable storage drive 1414. As will be appreciated, the removable storage unit 1418 includes a computer usable storage medium having stored therein computer software and/or data.

In alternative embodiments, secondary memory 1410 may include other similar devices for allowing computer programs or other instructions to be loaded into computer system 1400. Such devices may include, for example, a removable storage unit 1422 and an interface 1420. Examples of such may include a program cartridge and cartridge interface (such as that found in video game devices), a removable memory chip (such as an erasable programmable read only memory (EPROM), or programmable read only memory (PROM)) and associated socket, and other removable storage units 1422 and interfaces 1420, which allow software and data to be transferred from the removable storage unit 1422 to computer system 1400.

Computer system 1400 may also include a communications interface 1424. Communications interface 1424 allows software and data to be transferred between computer system 1400 and external devices. Examples of communications interface 1424 may include a modem, a network interface (such as an Ethernet card), a communications port, a Personal Computer Memory Card International Association (PCMCIA) slot and card, etc. Software and data transferred via communications interface 1424 are in the form of signals 1428 which may be electronic, electromagnetic, optical or other signals capable of being received by communications interface 1424. These signals 1428 are provided to communications interface 1424 via a communications path (e.g., channel) 1426. This channel 1426 carries signals 1428 and may be implemented using wire or cable, fiber optics, a telephone line, a cellular link, a radio frequency (RF) link and other communications channels.

In this document, the terms "computer program medium" and "computer usable medium" are used to generally refer to media such as removable storage drive 1414, a hard disk installed in hard disk drive 1412, and signals 1428. These computer program products provide software to computer system 1400. The tool is directed to such computer program products.

Computer programs (also referred to as computer control logic) are stored in main memory 1408 and/or secondary memory 1410. Computer programs may also be received via communications interface 1424. Such computer programs, when executed, enable the computer system 1400 to perform the features of the present tool, as discussed herein. In particular, the computer programs, when executed, enable the processor 1404 to perform the features of the present tool. Accordingly, such computer programs represent controllers of the computer system 1400.

In an example embodiment of the invention implemented using software, the software may be stored in a computer program product and loaded into computer system 1400 using removable storage drive 1414, hard drive 1412 or communications interface 1424. The control logic (software), when executed by the processor 1404, causes the processor 1404 to perform the functions of the tool as described herein.

In another embodiment, the tool is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the tool is implemented using a combination of both hardware and software.

While various example embodiments of the invention have been described above, it should be understood that they have been presented by way of example, and not limitation. It will be apparent to persons skilled in the relevant art(s) that various changes in form and detail can be made therein without departing from the spirit and scope of the present tool. Thus, the present tool should not be limited by any of the above described example embodiments, but should be defined only in accordance with the following claims and their equivalents.

In addition, it should be understood that the FIGS. 1-13, which highlight the functionality and advantages of the present tool, are presented for example purposes only. The architecture of the present tool is sufficiently flexible and configurable, such that it may be utilized (and navigated) in ways other than that shown in the accompanying figures.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present tool in any way. It is also to be understood that the blocks and processes recited in the claims need not be performed in the order presented.

What is claimed is:

1. A method for analyzing a computer program comprising the steps of:
generating a work file, the work file including at least one test instance comprising: subroutine, branch and file instances and being associated with the computer program;
counting a total number of each test instance in the computer program; and
creating a test case corresponding to each instance.

2. The method according to claim 1, further comprising the step of:
inserting a test case header to a record in the work file, the test case header including a unique test case number and a test case classification.

3. The method according to claim 2, further comprising the step of:
inserting a plurality of instructions to the test case header based on the test case classification.

4. The method according to claim 1, further comprising the step of:
creating a test case for a subroutine instance.

5. The method according to claim 1, further comprising the step of:
generating a warning message corresponding to a test case having a conditional instruction without an associated branch.

6. A computer-readable medium having stored thereon sequences of instructions, the sequences of instructions including instructions which when executed by a computer system causes the computer system to perform:
generating a work file, the work file including at least one test instance comprising: subroutine, branch and file instances and being associated with a program under test;
counting a total number of each test instance in the program under test; and
creating a test case corresponding to each instance.

7. The computer readable medium according to claim 6, further having stored thereon sequences of instructions which cause the computer system to perform:
inserting a test case header to a record in the work file, the test case header including a unique test case number and a test case classification.

8. The computer readable medium according to claim 7, further having stored thereon sequences of instructions which cause the computer system to perform:
inserting a plurality of instructions to the test case header based on the test case classification.

9. The computer readable medium according to claim 6, further having stored thereon sequences of instructions which cause the computer system to perform:
creating a test case for a subroutine instance.

10. The computer readable medium according to claim 6, further having stored thereon sequences of instructions which cause the computer system to perform:
generating a warning message corresponding to a test case having a conditional instruction without an associated branch.

11. A system for analyzing a computer program comprising:
an analysis module constructed to generate a work file, the work file including at least one test instance comprising: subroutine, branch and file instances and being associated with the computer program;
to count a total number of each test instance in the computer program; and
to create a test case corresponding to each instance.

12. The system according to claim 11, wherein the analysis module is further constructed to insert a test case header to a record in the work file, the test case header including a unique test case number and a test case classification.

13. The system according to claim 12, wherein the analysis module is further constructed to insert a plurality of instructions to the test case header based on the test case classification.

14. The system according to claim 11, wherein the analysis module is further constructed to create a test case for a subroutine instance.

15. The system according to claim 11, wherein the analysis module is further constructed to generate a warning message corresponding to a test case having a conditional instruction without an associated branch.

* * * * *